(12) United States Patent
Bernhardt et al.

(10) Patent No.: US 10,543,900 B2
(45) Date of Patent: Jan. 28, 2020

(54) INFLATABLE PROPELLER

(71) Applicant: The Boeing Company, Chicago, IL (US)

(72) Inventors: Roger David Bernhardt, O'Fallon, MO (US); Donald V. Drouin, Jr., O'Fallon, IL (US)

(73) Assignee: The Boeing Company, Chicago, IL (US)

( * ) Notice: Subject to any disclaimer, the term of this patent is extended or adjusted under 35 U.S.C. 154(b) by 517 days.

(21) Appl. No.: 15/292,812

(22) Filed: Oct. 13, 2016

(65) Prior Publication Data

US 2018/0105257 A1    Apr. 19, 2018

(51) Int. Cl.
| B64C 11/18 | (2006.01) |
| B64C 11/20 | (2006.01) |
| B64B 1/30 | (2006.01) |
| B64C 39/10 | (2006.01) |

(52) U.S. Cl.
CPC ............... B64C 11/18 (2013.01); B64B 1/30 (2013.01); B64C 11/20 (2013.01); B64C 39/10 (2013.01)

(58) Field of Classification Search
CPC ..................................................... B64C 11/28
See application file for complete search history.

(56) References Cited

U.S. PATENT DOCUMENTS

| 2,616,509 A | 11/1952 | Thomas |
| 2,918,978 A | 12/1959 | Fanti |
| 3,384,183 A * | 5/1968 | Braverman ............... B64C 3/30 416/84 |
| 5,686,003 A * | 11/1997 | Ingram .................. B64D 15/12 219/201 |
| 6,015,115 A * | 1/2000 | Dorsett ..................... B64C 3/46 244/123.11 |
| 7,073,749 B2 | 7/2006 | Krill et al. |
| 7,093,789 B2 | 8/2006 | Barocela et al. |
| 7,137,592 B2 | 11/2006 | Barocela et al. |
| 7,410,122 B2 | 8/2008 | Robbins et al. |
| 7,938,623 B2 * | 5/2011 | Cairo ..................... F03D 1/065 416/226 |
| 8,366,052 B1 | 2/2013 | Lutke et al. |
| 10,041,355 B2 * | 8/2018 | Hussain .................. F01D 5/148 |
| 2004/0069907 A1 | 4/2004 | Dockter et al. |
| 2005/0151007 A1 | 7/2005 | Cadogan et al. |

(Continued)

OTHER PUBLICATIONS

European Patent Office Examination Report, dated Sep. 13, 2017, regarding Application No. 17183531.7, 11 pages.

(Continued)

*Primary Examiner* — Richard A Edgar
*Assistant Examiner* — Brian O Peters
(74) *Attorney, Agent, or Firm* — Yee & Associates, P.C.

(57) ABSTRACT

A method and apparatus for controlling movement of an aircraft. An aerodynamic function desired for controlling the movement of the aircraft at a particular altitude is identified. The aerodynamic function identified is part of a group of aerodynamic functions used to control the movement of the aircraft at a number of different altitudes. A group of inflatable blades is filled with a fluid to a pressure that corresponds to the aerodynamic function. The group of inflatable blades at the pressure has a shape and a group of dimensions that provide the aerodynamic function.

24 Claims, 13 Drawing Sheets

(56) References Cited

U.S. PATENT DOCUMENTS

2010/0213718 A1* 8/2010 Kelly ................. F03D 5/04
290/55
2011/0038727 A1* 2/2011 Vos ................... B64C 3/46
416/1

OTHER PUBLICATIONS

Fang et al., "Reconfigurable photonic crystals enabled by pressure-responsive shape-memory polymers," Nature Communications, vol. 6, No. 7416, Jun. 2015, 8 pages.
Liu et al., "Effects of external pressure on phase transformation of shape memory alloy cylinder," International Journal of Mechanical Sciences, vol. 88, Nov. 2014, pp. 8-16.

* cited by examiner

INFLATABLE PROPELLER

BACKGROUND INFORMATION

1. Field

The present disclosure relates generally to aircraft, and in particular, to controlling movement of the aircraft.

2. Background

Aircraft fly by displacing ambient air to generate lift. The aircraft may fly using static lift, dynamic lift, or some combination thereof. The aircraft also operates at many different altitudes. Further, the aircraft may operate with many different system constraints and flight conditions. The design of the aircraft often depends on what altitudes and speed the aircraft will fly at during operation of the aircraft. For example, a high-altitude, lighter-than-air aircraft flying at 100,000 feet at relatively slower speeds may employ propellers that are much longer, lower speed, and shaped differently than engine propeller aircraft used for general aviation. The difference in propeller design, in part, is due to a change in air density at the different operating altitudes. At higher altitudes, the density of the air is thinner. As a result, propellers designed for lower altitudes will not provide the performance needed at higher altitudes, such as altitudes from 50,000 to 125,000 feet.

As a result, the aircraft designed for one range of altitudes may not perform as well as desired at a different range of altitudes. Similarly, a vehicle design may not achieve maximum high altitude performance if the aircraft is also designed to take-off, land, operate, climb, and descend through lower altitudes with high density air, steady winds, and gusting winds. One solution involves using other secondary approaches to allow high-altitude long endurance (HALE) aircraft to reach higher altitudes. For example, secondary or supplemental propulsion, captive carriage on another vehicle, or towing by another vehicle may be employed.

For example, a high-altitude long endurance (HALE) aircraft is often carried by an aircraft or rocket close to the range of altitudes at which the HALE aircraft operates. This type of deployment of the aircraft may be more complex and expensive than desired.

Therefore, it would be desirable to have a method and apparatus that take into account at least some of the issues discussed above, as well as other possible issues. For example, it would be desirable to have a method and apparatus that overcomes a technical problem with controlling movement of the aircraft at the different altitudes.

SUMMARY

An embodiment of the present disclosure provides an apparatus comprising a hub and a group of inflatable blades in which each of the group of blades has an end associated with the hub. The group of inflatable blades is configured to have a group of aerodynamic functions that control movement of an aircraft at a number of different altitudes. The group of aerodynamic functions is selected by a group of modes of inflation with a fluid.

Another embodiment of the present disclosure provides an aircraft movement control system comprising an inflatable propeller. The inflatable propeller comprises a hub and a group of inflatable blades in which each of the group of blades has an end associated with the hub. The group of inflatable blades has a shape and a group of dimensions that provide propulsion within a desired level of performance at a selected altitude.

Yet another embodiment of the present disclosure provides a method for controlling movement of an aircraft. An aerodynamic function desired for controlling the movement of the aircraft at a particular altitude is identified. The aerodynamic function identified is part of a group of aerodynamic functions used to control the movement of the aircraft at a number of different altitudes. A group of inflatable blades is filled with a fluid to a pressure that corresponds to the aerodynamic function. The group of inflatable blades at the pressure has a shape and a group of dimensions that provide the aerodynamic function.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a movement control system that is configurable to provide a needed amount of performance in moving an aircraft. The amount of performance may be measured using different metrics including efficiency, speed, or other metrics. Further, the movement may be through at least one of altitudes, orientations, speed, directions, or other parameters. For example, the illustrative embodiments recognize and take into account that it would be desirable to have a propeller with blades that can change characteristics such as length, width, and shape based on a group of parameters at which the propeller will operate. The group of parameters may be selected from at least one of altitude, temperature, rotation speed, motion speed, motion orientation, differential loading, energy efficiency, or other parameters relating to movement of the aircraft. The shape may include at least one of airfoil characteristics, chord size, camber and chordwise shape, thickness, or planform shape, spanwise taper, bending, twist, or other characteristics.

As used herein, "a group of", when used with reference to items, means one or more items. For example, "a group of parameters" is one or more parameters.

Thus, the illustrative embodiments provide a method and apparatus for changing the configuration of a propeller. In one illustrative example, the propeller is an inflatable propeller and comprises a hub and a group of inflatable blades. The group of inflatable blades each have an end associated with the hub. The group of inflatable blades is configured to have a group of aerodynamic functions that control movement of an aircraft at a number of different altitudes, wherein the group of aerodynamic functions is selected by a group of modes of inflation with a fluid. Movement may include at least one of forward direction or reverse direction in which speed and at least one of pitch, yaw, or roll changes may occur.

Further, "a number of", when used with reference to items, means one or more items. For example, "a number of different altitudes" is one or more different altitudes.

Figure 1:
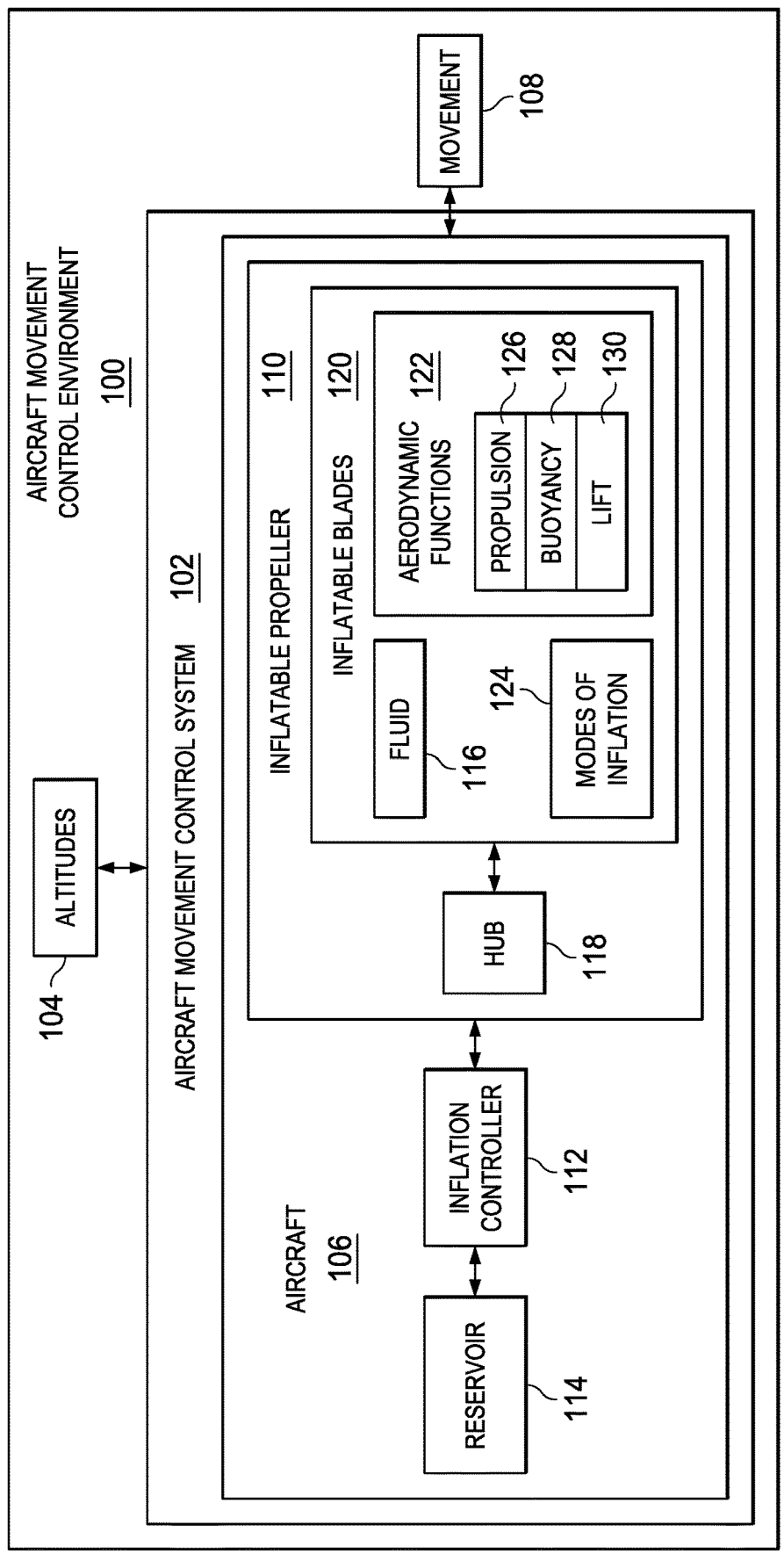
FIG. 1 is an illustration of an aircraft movement control environment in accordance with an illustrative embodiment.

With reference now to the figures, and in particular, with reference to FIG. 1, an illustration of an aircraft movement control environment is depicted in accordance with an illustrative embodiment. In aircraft movement control environment 100, aircraft 106 operates at a range of altitudes 104.

In this illustrative example, aircraft 106 may take a number of different forms. For example, aircraft 106 may be selected from a group comprising a lighter-than-air aircraft, a heavier-than-air aircraft, a high-altitude long endurance (HALE) aircraft, a flying wing, an airship, a zeppelin, a blimp, or other suitable types of aircraft.

As depicted, aircraft 106 has aircraft movement control system 102 that controls movement 108 of aircraft 106 through altitudes 104. Aircraft movement control system 102 includes a number of different components. In this illustrative example, aircraft movement control system 102 comprises inflatable propeller 110, inflation controller 112, and reservoir 114.

Reservoir 114 is a structure that holds fluid 116 for use by inflation controller 112. As depicted, fluid 116 is selected from at least one of helium, hydrogen, neon, ammonia, methane, oxygen, air, nitrogen, or some other suitable type of fluid. Fluid 116 may be stored in liquid or gaseous form. In some illustrative examples, reservoir 114 may be unnecessary, such as when fluid 116 takes the form of air.

As depicted, inflatable propeller 110 is an apparatus used to facilitate movement 108 of aircraft 106. Inflatable propeller 110 comprises hub 118 and inflatable blades 120.

Hub 118 is a physical structure and is attached to a propulsion system (not shown) that may rotate hub 118 to cause inflatable propeller 110 to generate thrust, thus causing movement 108 of aircraft 106. Inflatable blades 120 each have an end associated with hub 118. In some illustrative examples, inflatable blades 120 may be connected at the tips, and outer loop, in addition to or in place of hub 118.

The group of inflatable blades 120 is configured to have a group of aerodynamic functions 122 that control movement 108 of aircraft 106 at a number of different altitudes in altitudes 104. The group of aerodynamic functions 122 is selected by a group of modes of inflation 124 with fluid 116.

Inflation controller 112 is configured to control fluid 116 in the group of inflatable blades 120. Inflation controller 112 may include a group of pumps or valves and a controller, for example, a microprocessor programmed to control the operation of the group of pumps or valves.

In the illustrative example, inflation controller 112 controls fluid 116 in the group of inflatable blades 120 by at least one of pumping fluid 116 into the group of inflatable blades 120 or out of the group of inflatable blades 120. Fluid 116 may be pumped into or out of one or more of the group of inflatable blades 120 independently from other blades in the group of inflatable blades 120. For example, inflation controller 112 may pump fluid 116 into one inflatable blade while pumping fluid 116 out of another inflatable blade in the group of inflatable blades 120. Pumping fluid may occur to control pressure inside the inflatable blade relative to the outside pressure (e.g., ambient static pressure) and is constrained by the inflatable blade membrane material elastic, strain, stiffness, and strength characteristics.

Inflation controller 112 selects which ones of the group of aerodynamic functions 122 that are active through controlling fluid 116 in the group of inflatable blades 120. As depicted, the group of aerodynamic functions 122 that controls movement 108 is selected from at least one of propulsion 126, buoyancy 128, lift 130, or some other suitable type of aerodynamic function. The selection of an aerodynamic function in the group of aerodynamic functions 122 may be used to operate the aircraft in different modes. These modes include floating, orientation change, cruise, and dash.

For example, Propulsion 126 comprises generating thrust when inflatable propeller 110 is operating (e.g., rotating).

Changing the characteristics of group of inflatable blades 120 allows inflatable propeller 110 to change the amount of thrust generated. For example, the characteristics include a length and a shape of the group of inflatable blades 120. The change in the characteristics may be such that the group of inflatable blades 120 is more efficient at higher altitudes. For example, the length of the group of inflatable blades 120 may be increased. The change in shape may include changing the pitch of inflatable blades 120.

The shape of inflatable blades 120 depends on different factors. For example, the factors include at least one of altitudes 104, air temperature, blade rotation speed, aircraft forward motion speed, aircraft motion orientation or maneuver, differential loading to cause a change in aircraft orientation or maneuvering rates, energy efficiency, optimize propeller performance at different altitudes, or other factors.

Buoyancy 128 may be changed by varying a volume of inflatable blades 120. The volume of inflatable blades 120 may be increased to generate an upward force by inflatable propeller 110. For example, the upward force may contribute to lift 130 of aircraft 106. Buoyancy 128 may be decreased by decreasing the volume of the group of inflatable blades 120. Further, with lift 130, the group of inflatable blades 120 may have at least one of a shape or dimension that results in a force being exerted on the group of inflatable blades 120 in a direction substantially counter to the force of weight of the aircraft. In other words, the group of inflatable blades 120 may function in a fashion similar to a wing or some other type of airfoil used to provide lift 130 for aircraft 106. In this example, buoyancy 128 of fluid 116 is the fluid density within inflatable blades 120 relative to the outside air density at the altitude and temperature. The fluid density is defined by fluid type, temperature, and pressure. With enough pressure, the gas turns into a liquid. The possible pressure is dependent on the inflatable propeller bladder material characteristics, fabrication, and thickness. The inflatable blade material weight and hub material weight subtract from the fluid buoyancy forces to yield the overall buoyancy for inflatable propeller 110.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, propulsion 126 may include adjusting at least one of the pitch, chord, length, or some other characteristic of the group of inflatable blades 120. Buoyancy 128 may be selected from at least one of a negative buoyancy, a positive buoyancy, or a neutral buoyancy. For example, one inflatable blade may have a negative buoyancy while another inflatable blade may have a positive buoyancy.

Thus, aircraft movement control system 102 provides a method and apparatus that overcome a technical problem with controlling movement 108 of aircraft 106 at different altitudes 104. The use of inflatable propeller 110 may provide one or more technical solutions to controlling movement 108 of aircraft 106. For example, the amount or pressure of fluid 116 in inflatable propeller 110 may be selected to provide desired aerodynamic functions 122 based on altitudes 104 at which aircraft 106 operates. For example, the group of inflatable blades 120 and inflatable propeller 110 may be configured to have different dimensions and shapes that provide a desired level of propulsion 126 or propulsion efficiency for altitudes and other flight or inflatable propeller conditions.

Further, inflatable propeller 110 may provide a technical solution in which movement 108 may be controlled in a number of different ways other than propulsion 126. The configuration of inflatable propeller 110 may also provide aerodynamic functions 122 that include at least one of buoyancy 128 or lift 130, in addition to or in place of propulsion 126, depending on the particular implementation.

Figure 2:
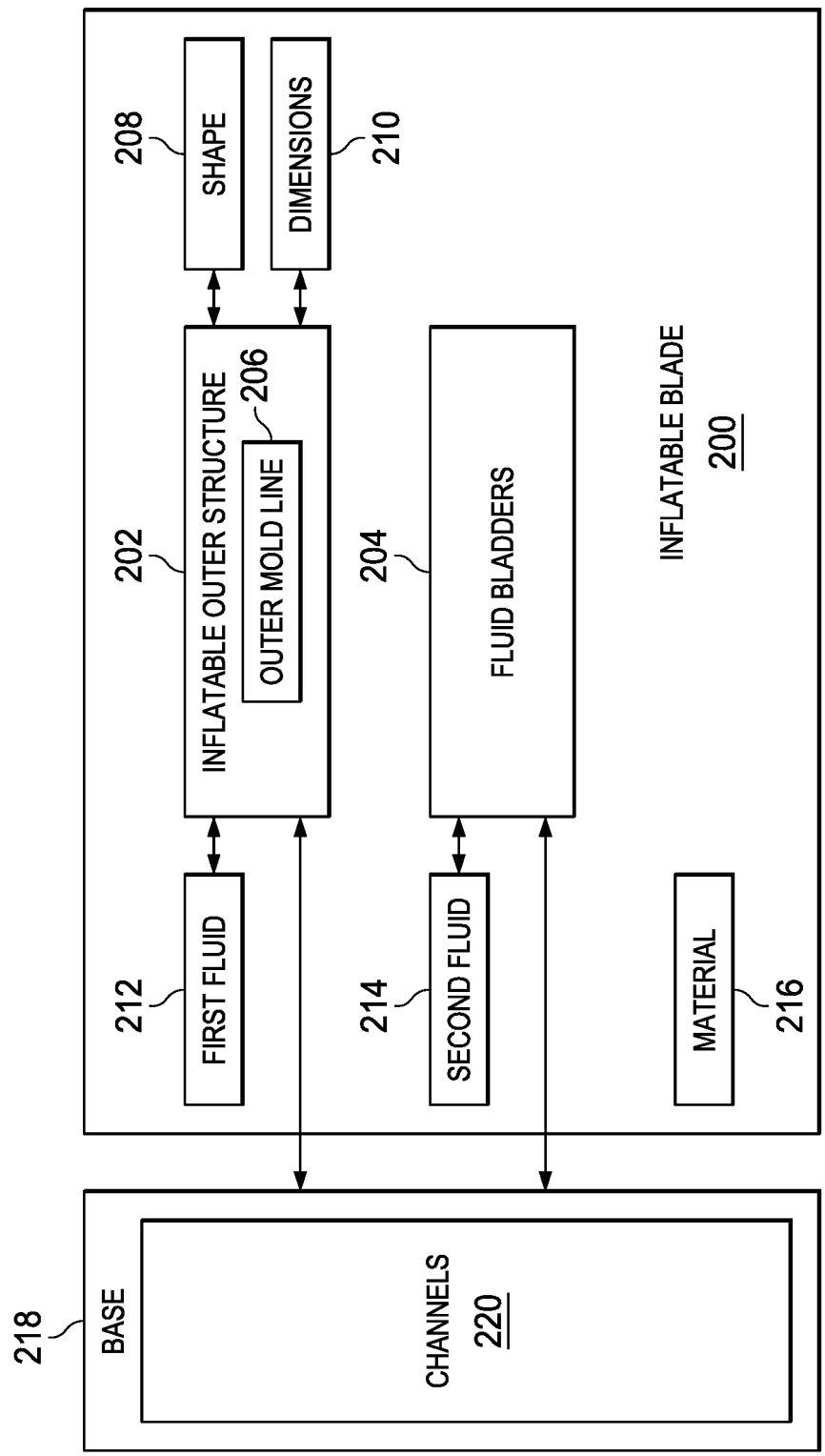
FIG. 2 is an illustration of a block diagram of an inflatable blade in accordance with an illustrative embodiment.

With reference next to FIG. 2, an illustration of a block diagram of an inflatable blade is depicted in accordance with an illustrative embodiment. In the illustrative examples, the same reference numeral may be used in more than one figure. This reuse of a reference numeral in different figures represents the same element in the different figures. As depicted, inflatable blade 200 is located in the group of inflatable blades 120 in FIG. 1.

In this illustrative example, inflatable blade 200 comprises inflatable outer structure 202 and fluid bladders 204 located within inflatable outer structure 202. Inflatable outer structure 202 is outer mold line 206 for inflatable blade 200. As depicted, at least one of inflatable outer structure 202 or fluid bladders 204 are selectively inflated with fluid 116 in FIG. 1 to change at least one of shape 208 or dimensions 210 for inflatable outer structure 202.

Shape 208 for inflatable outer structure 202 may be selected from one of a disk, a balloon, a wing, an elongated member, a cylinder, or some other suitable shape. As depicted, shape 208 has a group of dimensions 210 that may change. The group of dimensions 210 is selected from at least one of a length, a width, a radius, or some other suitable type of dimension.

As depicted, shape 208 for inflatable outer structure 202 may be influenced by inflation of one or more of fluid bladders 204 inside of inflatable outer structure 202. Fluid bladders 204 have shapes selected from at least one of a rod, a sphere, a disk, or some other suitable type of shape.

Further, shape 208 with the group of dimensions 210 may include chordwise shapes and spanwise shapes. Shape 208 may have a group of dimensions 210 that make inflatable blade 200, which include a thickness, a camber, a taper, a twist, an airfoil shape, a trailing shape, and a leading edge shape. The shapes may change dynamically during operation of inflatable blade 200 by changing the inflation of inflatable blade 200 with fluid 116 in FIG. 1.

In this illustrative example, fluid 116 in FIG. 1 may be used to fill at least one of inflatable outer structure 202 or fluid bladders 204. In yet another example, fluid 116 may comprise first fluid 212 and second fluid 214, in which inflatable outer structure 202 is inflated with first fluid 212 and fluid bladders 204 are inflated with second fluid 214. As depicted, first fluid 212 and second fluid 214 may be the same type or different type of fluid. In yet another example, different ones of fluid bladders 204 may be inflated with different types of fluids.

Further, inflatable blade 200 is comprised of material 216. Material 216 may be selected to change the shape of the group of inflatable blades 120 in FIG. 1 based on the pressure of fluid 116. For example, material 216 may be present in inflatable blade 200, in at least one of inflatable outer structure 202 or fluid bladders 204. Material 216 may aid in or control changing at least one of shape 208 or dimensions 210 for at least one of inflatable outer structure 202 or fluid bladders 204.

As depicted, material 216 may take a form selected from one of fibers, fabrics, threads, or other types of material in at least one of inflatable outer structure 202 or fluid bladders 204. In the illustrative examples, material 216 in inflatable outer structure 202 and fluid bladders 204 may be formed from a number of different types of structures. For example, material 216 may be selected from at least one of latex rubber, expanded polypropylene (EPP), a closed cell styrofoam foam that is semi-rigid and reinforced by inflatable interior components, mylar, polyethylene, a reinforced composite to add hoop strength, or other suitable types of material. Material 216 also may be comprised of at least one of a shape memory material (SMM), a shape memory alloy (SMA), or a shape memory polymer (SMP).

In this illustrative example, inflatable blade 200 also includes base 218. Base 218 is physically associated with inflatable outer structure 202 and fluid bladders 204. When one component is "associated" with another component, the association is a physical association. For example, a first component, such as base 218, may be considered to be physically associated with a second component, such as inflatable outer structure 202, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, an extension of the second component, or both.

As depicted, base 218 has channels 220. Channels 220 are connected to inflatable outer structure 202 and fluid bladders 204. In this illustrative example, inflatable outer structure 202 and each one of fluid bladders 204 may be connected to a corresponding channel in channels 220. In other words, each fluid bladder may be connected to a different channel in channels 220 from other fluid bladders in fluid bladders 204.

Channels 220 allow first fluid 212 to flow into and out of inflatable outer structure 202. Additionally, channels 220 allow for second fluid 214 to flow into and out of one or more of fluid bladders 204.

As a result, movement 108 in FIG. 1 may be controlled by changing shape 208 during specific flight conditions. These flight conditions include at least one of altitude, density, aircraft speed, propeller speed, or other suitable flight conditions. Shape 208 may be maintained for an entire revolution of inflatable blades 120. As a result, improvements may occur in at least one of forward speed or thrust efficiency.

In another example, at least one of shape 208 or dimensions 210 may be changed during rotation of inflatable blades 120. The change may change parameters such as twist of inflatable blades 120. This type of change may be useful for slower moving inflatable blades being used at high altitudes. In this manner, at least one of different lift or drag may occur depending on vertical and horizontal prop position, which results in asymmetric pitch, yaw, and roll forces depending on sequence, and controls aircraft movement, orientations and orientation rates.

With the inflation of inflatable blade 200 using fluid 116 to change at least one of shape 208 or the group of dimensions 210, various characteristics of inflatable blade 200 may be selected and changed during the operation of aircraft 106 in FIG. 1. For example, these characteristics may include at least one of weight, density, inertia, bending stiffness, or torsion stiffness of inflatable blade 200.

The illustration of an aircraft movement control environment 100 and the different components in this environment in FIGS. 1-2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in FIG. 1, aircraft movement control system 102 for aircraft 106 may include one or more additional inflatable propellers in addition to inflatable propeller 110. In this illustrative example, inflatable propeller 110 may be a first inflatable propeller for aircraft 106. Hub 118 is a first hub and the group of inflatable blades 120 is a first group of inflatable blades.

A second inflatable propeller may include a second hub in the second group of inflatable blades. The second group of inflatable blades has an end associated with the second hub. The second group of inflatable blades is configured to have the group of aerodynamic functions 122 that controls movement 108 of aircraft 106 at a number of different altitudes. Further, the group of aerodynamic functions 122 is selected by the group of modes of inflation 124 with fluid 116.

For example, the first inflatable propeller made has a first buoyancy, while the second inflatable propeller may have a second buoyancy. The point may be different such that aircraft 106 may have an upward tilt or some other orientation during flight, such as moving from a lower altitude to a higher altitude. This upward tilt may provide increased lift for aircraft 106.

Further, in another illustrative example, the first inflatable propeller and the second inflatable propeller may be positioned on the same coaxial axis. Also, when one of the inflatable propellers has more than one blade, not all of the blades for an inflatable propeller need to be inflated to the same pressure with fluid 116. Also, the first inflatable propeller may be filled with a different fluid from the second inflatable propeller. In yet another example, different blades within inflatable propeller 110 may be filled with different fluids from each other.

Figure 3:
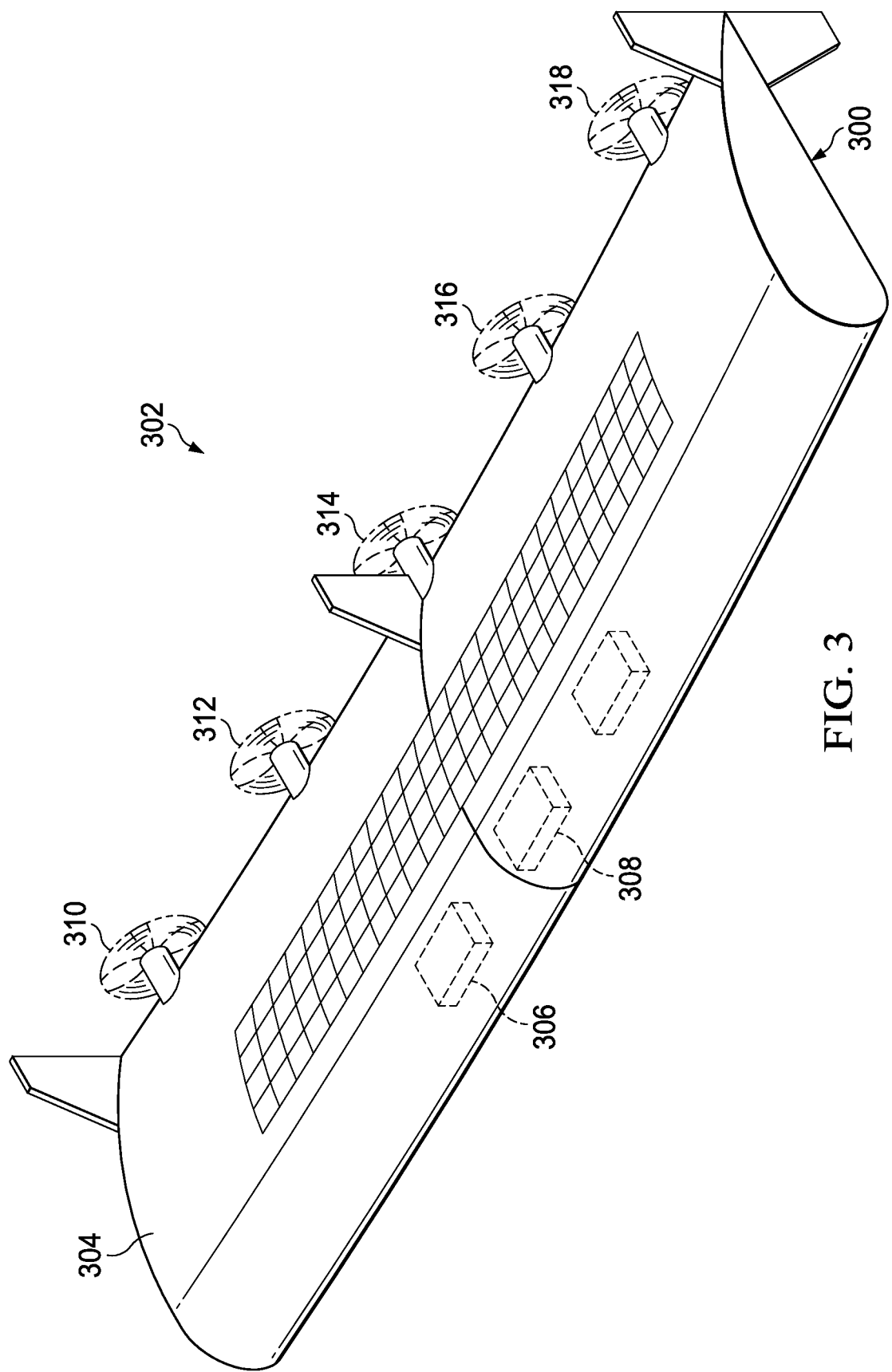
FIG. 3 is an illustration of an aircraft with an aircraft movement control system in accordance with an illustrative embodiment.

With reference now to FIG. 3, illustration of an aircraft with an aircraft movement control system is depicted in accordance with illustrative embodiment. As depicted, aircraft 300 is an example of one implementation for aircraft 106 in FIG. 1.

As depicted, aircraft 300 includes a movement control system 302 associated with airframe 304. Movement control system 302 is an example of one implementation for aircraft movement control system 102 in FIG. 1. Movement control system 302 includes reservoir 306, inflation controller 308, inflatable propeller 310, inflatable propeller 312, inflatable propeller 314, inflatable propeller 316, and inflatable propeller 318. Inflatable propellers 310-318 are examples of an implementation for inflatable propeller 110 in FIG. 1.

Figure 4:
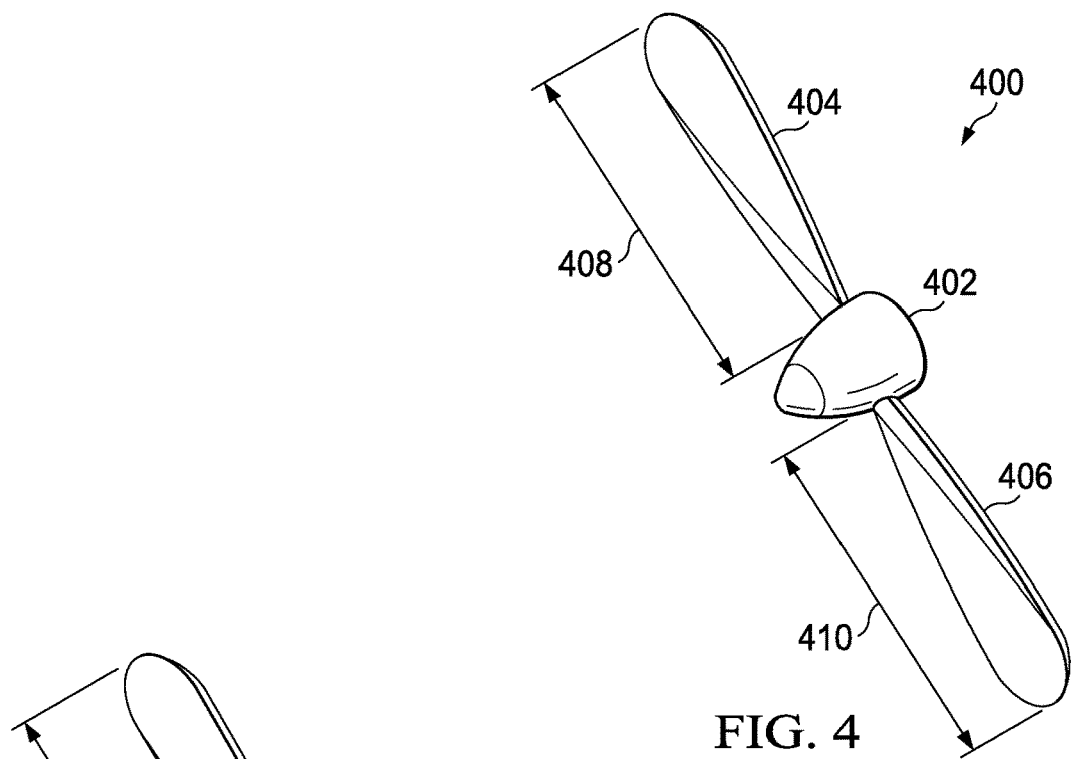
FIG. 4 is an illustration of an inflatable propeller in accordance with an illustrative embodiment.

With reference next to FIG. 4, an illustration of an inflatable propeller is depicted in accordance with an illustrative embodiment. In this illustrative example, inflatable propeller 400 is an example of one physical implementation for inflatable propeller 110 shown in block form in FIG. 1.

As depicted, inflatable propeller 400 has hub 402, inflatable blade 404, and inflatable blade 406. In this example, inflatable blade 404 has length 408 and inflatable blade 406 has length 410 when inflated to a first level of inflation as shown in this figure. At this level of inflation, inflatable propeller 400 may be used at altitudes closer to the surface. These altitudes may be, for example, from sea level to about 2,000 feet or to about 8,000 feet.

Figure 5:
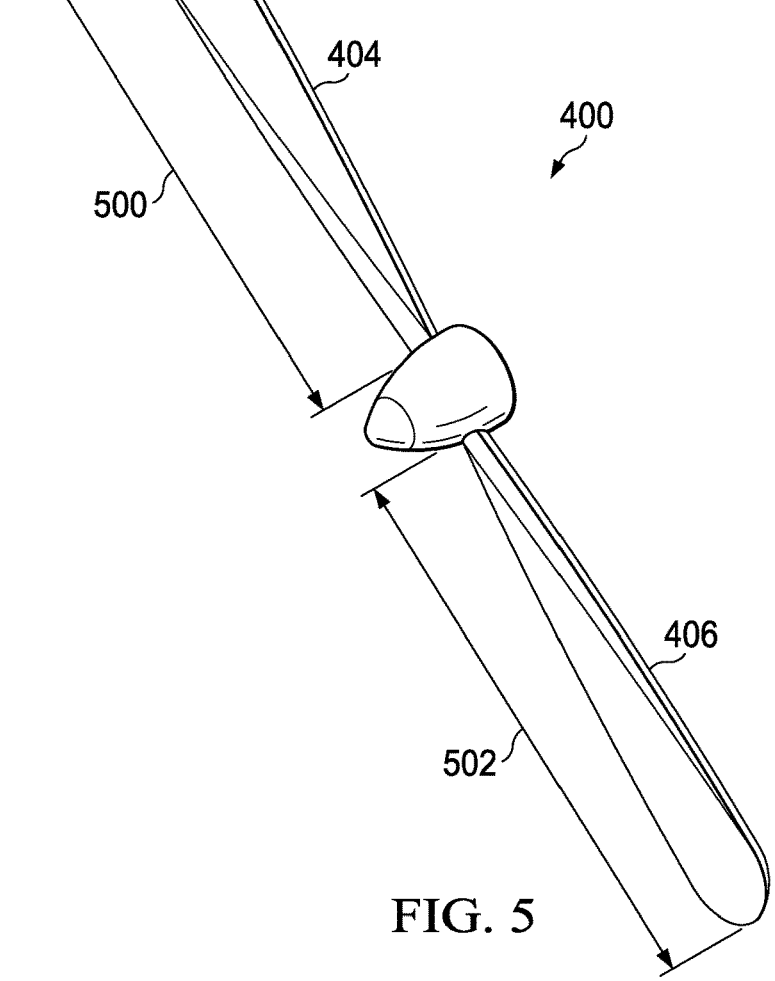
FIG. 5 is an illustration of an inflatable propeller in accordance with an illustrative embodiment.

With reference now to FIG. 5, an illustration of an inflatable propeller is depicted in accordance with an illustrative embodiment. As depicted in FIG. 5, inflatable propeller 400 is inflated to a second level inflation. In this illustrative example, additional fluid has been pumped into inflatable blade 404 and inflatable blade 406. The additional fluid increases inflatable blade 404 to length 500 and inflatable blade 406 to length 502. Length 500 is greater than length 408 and length 502 is greater than length 410.

In this configuration, inflatable propeller 400 is configured for use at higher altitudes. These altitudes may be altitudes used by high-altitude long endurance (HALE) aircraft. The altitudes may be, for example, 65,000 feet, 100,000 feet, or some other altitude.

Figure 6:
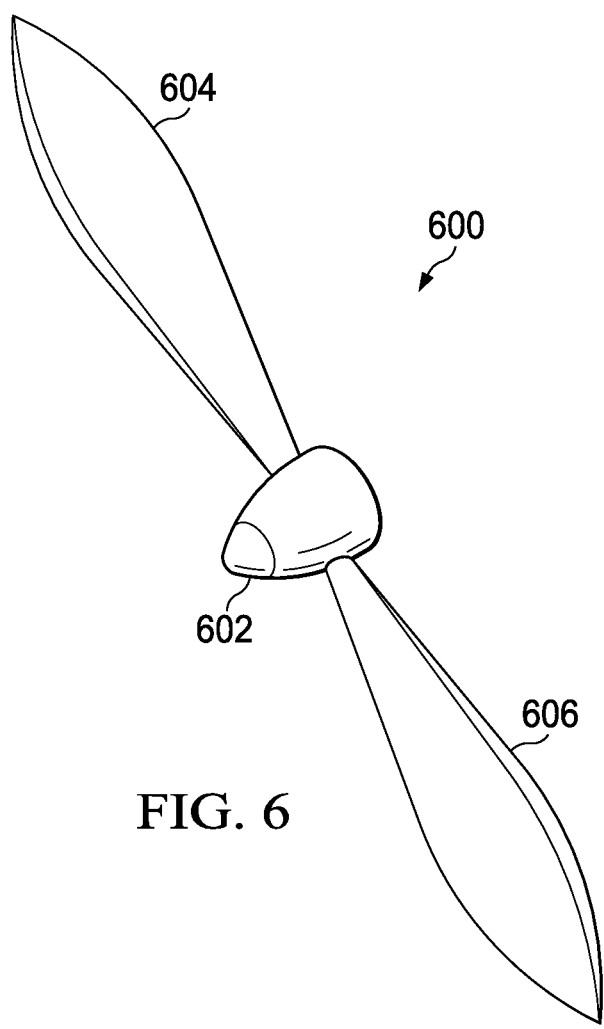
FIG. 6 is an illustration of an inflatable blade that provides an aerodynamic function in the form of low altitude, higher speed operation for maximum thrust in accordance with an illustrative embodiment.

With reference next to FIG. 6, an illustration of an inflatable blade that provides an aerodynamic function in the form of low altitude, higher speed operation for maximum thrust is depicted in accordance with an illustrative embodiment. In this depicted example, inflatable propeller 600 is an example of one implementation for inflatable propeller 110 in FIG. 1.

In this illustrative example, inflatable propeller 600 is configured to provide thrust as an aerodynamic function. Inflatable propeller 600 includes hub 602, inflatable blade 604, and inflatable blade 606. The amount of thrust is controlled by the shape of inflatable blade 604 and inflatable blade 606. For example, inflatable blade 604 and inflatable blade 606 have a shape of an airfoil, which generates thrust as inflatable blade 604 and inflatable blade 606 rotate. One or more physical characteristic of inflatable blade 604 and inflatable blade 606 may be varied to change the amount of thrust generated by inflatable propeller 600, such as, for example, a blade twist, a pitch angle, a diameter, a chord length, a span, and the like.

The thrust generated by inflatable blade 604 and inflatable blade 606 may also be based on a speed of the aircraft (e.g., the velocity of the incoming airflow) and properties of the atmosphere, such as, for example, a density, a temperature, or a pressure of the ambient air. The properties of the atmosphere are different at different altitudes. For example, the density and pressure of the air decreases as altitude increases. Inflatable propeller 600 may vary one or more physical characteristics of inflatable blade 604 or inflatable blade 606 to compensate for the changes in density and pressure.

Figure 7:
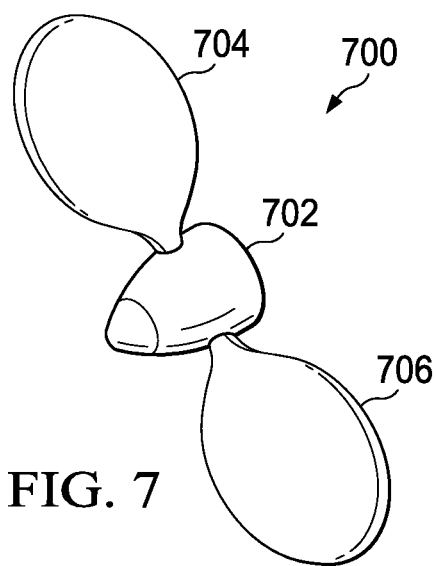
FIG. 7 is an illustration of an inflatable propeller configured for buoyancy in accordance with an illustrative embodiment.

Turning to FIG. 7, an illustration of an inflatable propeller configured for buoyancy is depicted in accordance with an illustrative embodiment. As depicted in FIG. 7, inflatable propeller 700 is shown inflated. In this illustrative example, inflatable propeller 700 is an example of one physical implementation for inflatable propeller 110 shown in block form in FIG. 1. Inflatable propeller 700 includes hub 702, inflatable blade 704, and inflatable blade 706.

In this illustrative example, fluid has been pumped into inflatable blade 704 and inflatable blade 706 such that inflatable blade 704 and inflatable blade 706 have a spherical shape. In this configuration, inflatable propeller 700 may be used to provide buoyancy for an aircraft.

Inflatable propeller 700 may provide an increase in buoyancy relative to inflatable propeller 400 shown in FIG. 4. Inflatable blade 704 and inflatable blade 706 shown in FIG. 7 have a greater volume than inflatable blade 404 and inflatable blade 406 shown in FIG. 4. The volume of the fluid in inflatable blade 704 and inflatable blade 706 may be such that inflatable propeller 700 generates an upward or buoyant force to cause inflatable propeller 700 to become positively buoyant. The buoyant force may contribute to lift 130 of aircraft 106 as seen in FIG. 1.

Figure 8:
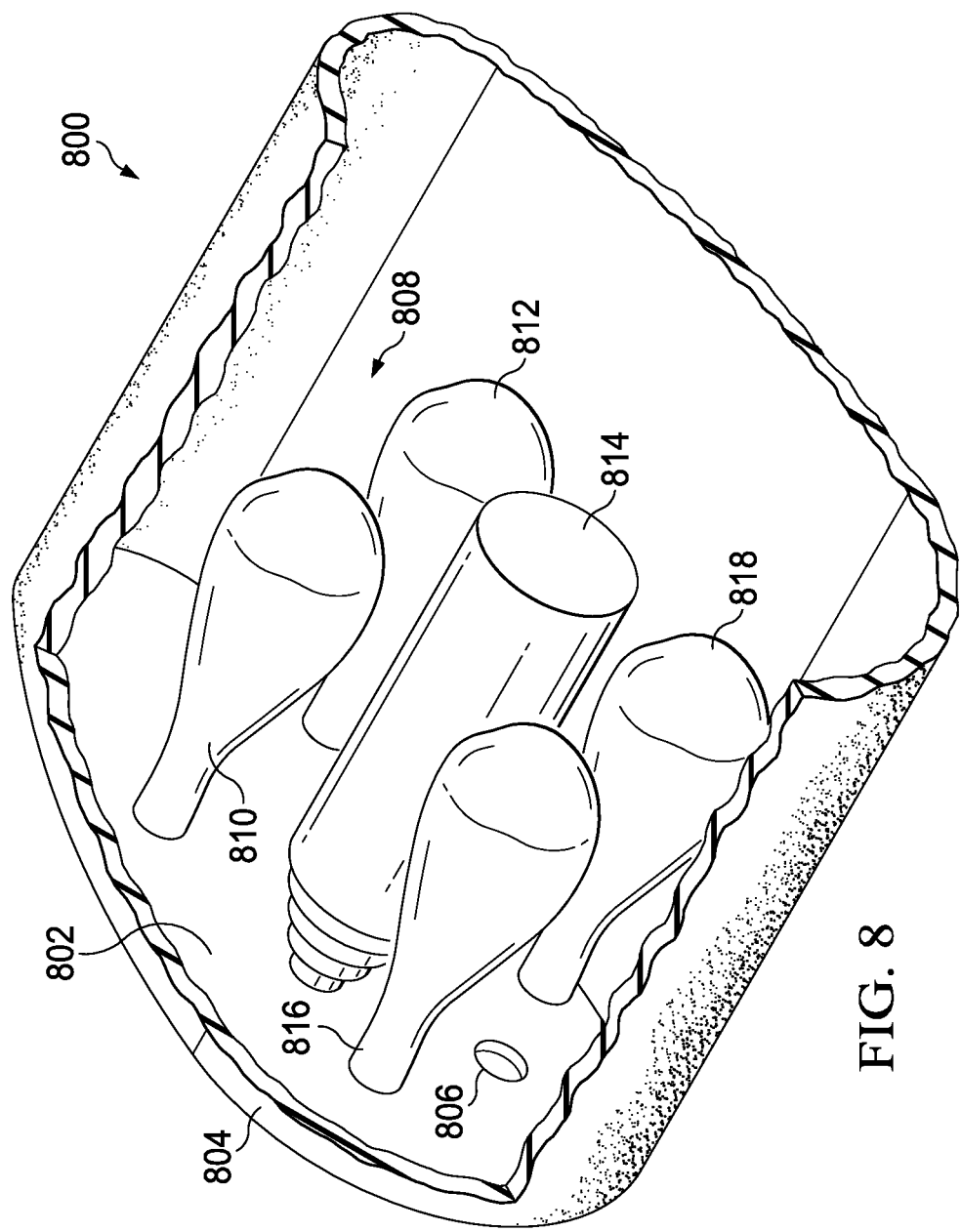
FIG. 8 is an illustration of an inflatable blade for an inflatable propeller in accordance with an illustrative embodiment.

With reference next to FIG. 8, an illustration of an inflatable blade for an inflatable propeller is depicted in accordance with an illustrative embodiment. Inflatable blade 800 is an example of one implementation for an inflatable blade in inflatable blades 120 in FIG. 1 and is shown in an exposed view.

As depicted, inflatable blade 800 comprises a number of different components. For example, inflatable blade 800 includes connecting structure 802 and inflatable outer structure 804.

In this exposed view of inflatable blade 800, various structures inside of inflatable outer structure 804 are shown. For example, structures such as channel 806 and fluid bladders 808 are seen in this exposed view within inflatable outer structure 804. Optionally, the structures may include more or fewer channels such as channel 806.

Connecting structure 802 is configured to be connected to a hub. In this example, channel 806 provides a mechanism to move a fluid in and out of at least one of inflatable outer structure 804 or fluid bladders 808. Inflatable outer structure 804 forms an outer mold line of inflatable blade 800.

Fluid bladders 808 are located inside of inflatable outer structure 804. In this example, fluid bladders 808 are examples of implementations of fluid bladders 204 in FIG. 2. As depicted, fluid bladders 808 include fluid bladder 810, fluid bladder 812, fluid bladder 814, fluid bladder 816, and fluid bladder 818.

As depicted, inflatable outer structure 804 is inflatable and may change shape or dimension based on at least one of the inflation of inflatable outer structure 804 or the inflation of fluid bladders 808.

Figure 9:
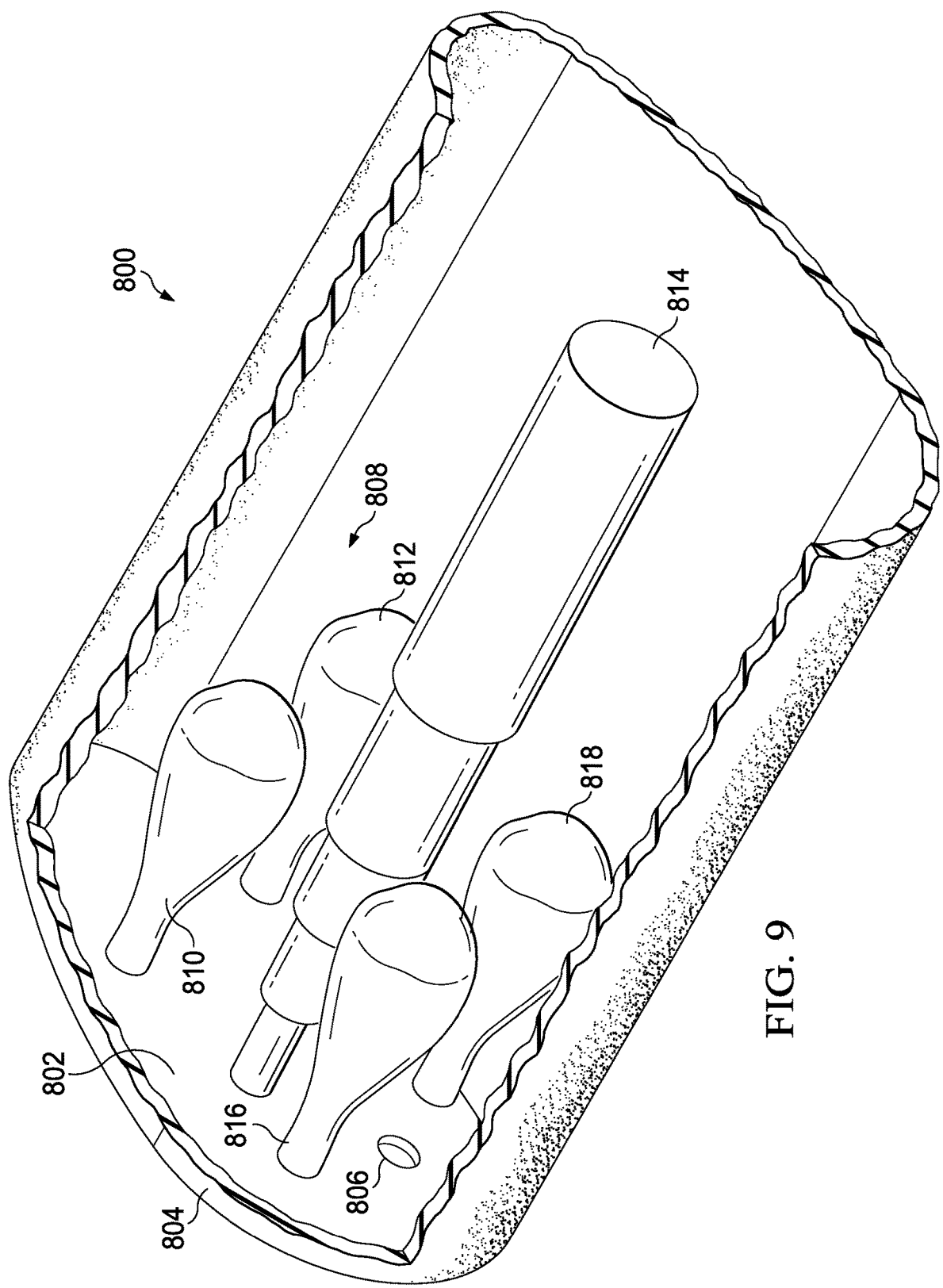
FIG. 9 is an illustration of a portion of an inflatable blade in accordance with an illustrative embodiment.

With reference next to FIG. 9, an illustration of a portion of an inflatable blade is depicted in accordance with an illustrative embodiment. In this example, inflatable outer structure 804 has been inflated with a fluid. Further, fluid bladder 814 in fluid bladders 808 has also been inflated with a fluid. The fluid in inflatable outer structure 804 may be the same or different from the fluid in fluid bladder 814. Further each of fluid bladders 808 may be the same or different type of fluid depending on the implementation. The inflation of inflatable outer structure 804 and fluid bladder 814 causes inflatable blade 800 to extend in length.

As depicted, inflatable outer structure 804 may be inflated using a fluid for two or more different levels of inflation. The different levels of inflation are used to control the shape and dimensions of inflatable outer structure 804.

Further, fluid bladders 808 may be inflated using a fluid, separately or in conjunction, with the inflation of inflatable outer structure 804. This inflation may be used to further control the shape and dimensions of inflatable blade 800.

The illustrations of inflatable blade 800 and the fluid bladders in FIGS. 8-9 are provided for purposes of illustrating one physical implementation of inflatable blade 200 shown in block form in FIG. 2. This illustration is not meant to limit the manner in which other inflatable blades may be implemented. For example, other numbers or types of fluid bladders may be located within the inflatable outer structures for other blades.

Figure 10:
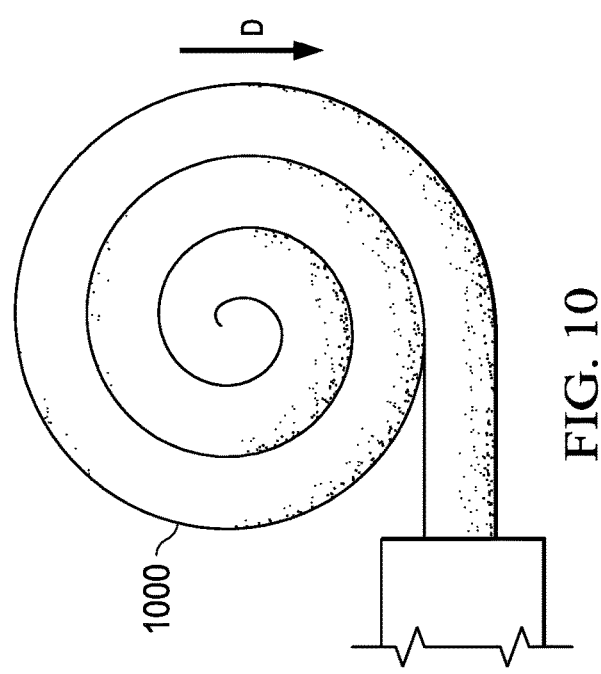
FIG. 10 is an illustration of an inflatable blade in an uninflated state in accordance with an illustrative embodiment.

Turning next to FIGS. 10-14, illustrations of changing the shape of an inflatable blade through the blade to different pressures are depicted in accordance with an illustrative embodiment. With reference first to FIG. 10, an illustration of an inflatable blade in an uninflated state is depicted in accordance with an illustrative embodiment. Inflatable blade 1000 is an example of one physical implementation for an inflatable blade in inflatable blades 120 of inflatable propeller 110 shown in block form in FIG. 1. In this figure, inflatable blade 1000 is shown rolled up in the uninflated state. Inflatable blade 1000 is coiled in an aft direction that is opposite a direction of travel of the aircraft indicated by direction D. In the uninflated state, inflatable blade 1000 may have a reduced drag profile relative to an inflated state. In other words, inflatable propeller 110 is feathered to substantially reduce drag generated by inflatable blade 1000 as the aircraft travels in direction D.

Figure 11:
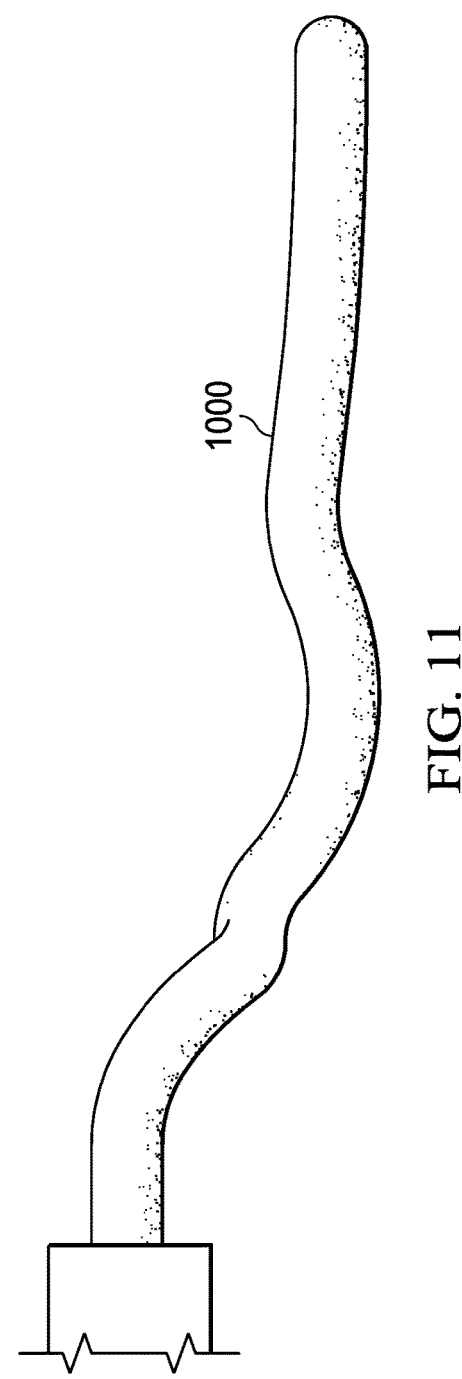
FIG. 11 is in illustration of an inflatable blade in a partially inflated state in accordance with an illustrative embodiment.

Turning next to FIG. 11, an illustration of an inflatable blade in a partially inflated state is depicted in accordance with an illustrative embodiment. As depicted, fluid is sent into inflatable blade 1000. As the fluid enters inflatable blade 1000, inflatable blade 1000 unrolls for deployment. In this illustrative example, the fluid may take various forms. For example, the fluid may be air, helium, hydrogen, or some combination thereof.

Figure 12:
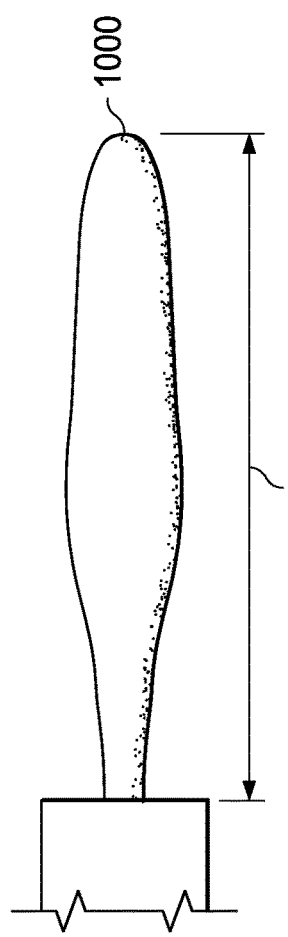
FIG. 12 is an illustration of an inflatable blade inflated to a first pressure in accordance with illustrative embodiment.

In FIG. 12, an illustration of an inflatable blade inflated to a first pressure is depicted in accordance with an illustrative embodiment. At the first pressure, inflatable blade 1000 may provide thrust for moving an aircraft. This movement of the aircraft may include moving in a particular direction, changing orientation, or other types of movement.

At the first pressure, inflatable blade 1000 has first length 1002. First length 1002 may be preselected such that inflatable blade 1000 provides thrust for a low altitude range. In other words, first length 1002 may be selected such that the inflatable propeller 110 of FIG. 1 operates at a first altitude range, which is suitable for a take-off phase of flight. For example, the first altitude range may be on ground, sea level, between sea level and 1,000 feet, or any other suitable altitude.

Figure 13:
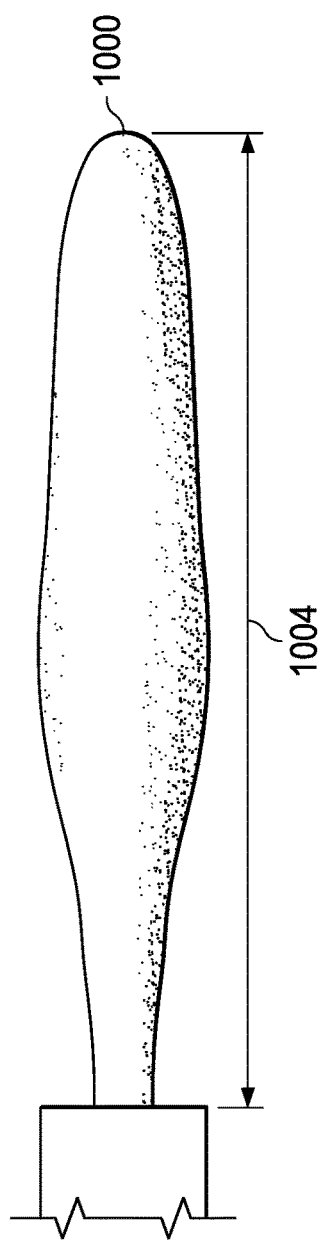
FIG. 13 is an illustration of an inflatable blade inflated to a second pressure in accordance with illustrative embodiment.

Turning now to FIG. 13, an illustration of an inflatable blade inflated to a second pressure is depicted in accordance with an illustrative embodiment. In this example, the second pressure in inflatable blade 1000 is greater than the first pressure. The second pressure may cause inflatable blade 1000 to increase in volume as compared to the first pressure. With the second pressure, the shape of inflatable blade 1000 may change to have a chord and span having increased pitch and twist as compared to inflatable blade 1000 as shown in FIG. 12.

At the second pressure, inflatable blade 1000 has second length 1004. Second length 1004 is greater than first length 1002 shown in FIG. 12. Second length 1004 may be preselected such that inflatable blade 1000 provides thrust at a second altitude range that is greater than the first altitude range. Second length 1004 may be preselected to provide thrust at a mid-altitude range. For example, second length 1004 may be selected such that inflatable propeller 110 operates at a climb phase of flight. For example, the second altitude range may be between 1,000 feet to 30,000 feet or more, or any other suitable altitude.

Optionally, the second pressure may cause inflatable blade 1000 to change shape in addition to or in place of the change in length. For example, the second pressure may cause inflatable blade 1000 to change in one or more of an airfoil characteristic, chord size, camber and chordwise shape, thickness, or planform shape, spanwise taper, bending, twist, or other characteristic.

Figure 14:
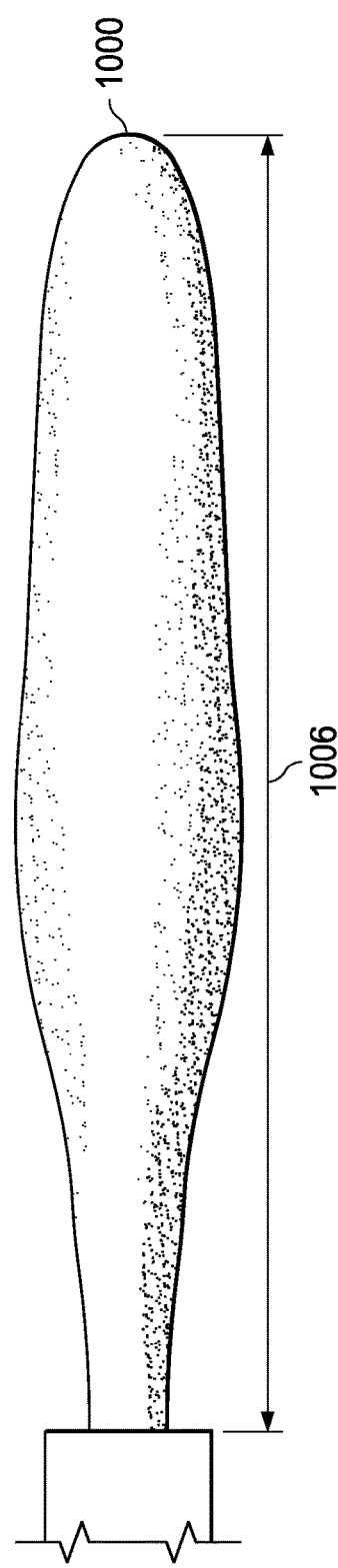
FIG. 14 is an illustration of an inflatable blade inflated to a third pressure in accordance with illustrative embodiment.

With reference to FIG. 14, another illustration of an inflatable blade inflated to a third pressure is depicted in accordance with an illustrative embodiment. The third pressure in inflatable blade 1000 is greater than the second pressure. With this level of inflation, the shape of inflatable blade 1000 may change from the shape show in FIG. 12. For example, the orientation of the chord and span may change.

At the third pressure, inflatable blade 1000 has third length 1006. Third length 1006 is greater than first length 1002 and second length 1004. Third length 1006 may be preselected such that inflatable blade 1000 provides thrust at a third altitude range that is greater than the first altitude range and the second altitude range. The third altitude range may be preselected to provide thrust at a high altitude. For example, third length 1006 may be selected such that inflatable propeller 110 shown in FIG. 1, operates at a cruise phase of flight. For example, the third altitude range may be between 30,000 feet to 90,000 feet or more, or any other suitable altitude range.

As depicted, inflatable blade 1000 has different shapes at different pressures. These different shapes result from characteristics of the materials used to form inflatable blade 1000. Inflatable blade 1000 may have an inflatable outer structure that forms the outer mold line. Further, inflatable blade 1000 also may include one or more fluid bladders within the inflatable outer structure.

In the illustrative example, the materials used in inflatable blade 1000 may have characteristics that change based on the pressure of inflation. These characteristics may be selected based on the thickness of materials, reinforcement materials, type of materials, shape of fluid bladders, the number of fluid bladders, or other suitable design parameters. In this manner, inflatable blade 1000 may change in at least one of span, court, twist, pitch, camber, or other characteristic.

The illustration of inflatable blade 1000 in FIGS. 10-14 are presented for purposes of illustrating one implementation for inflatable blades 120 shown in block form in FIG. 1. These illustrations are not meant to limit the manner in which other inflatable blades may be implemented. For example, other inflatable blades may have other pressures other than the three pressures shown for the three different shapes in FIGS. 10-14. For example, inflatable blade 1000 may have only a single pressure, five pressures, or some other number of pressures for changing the shape of inflatable blade 1000.

Figure 15:
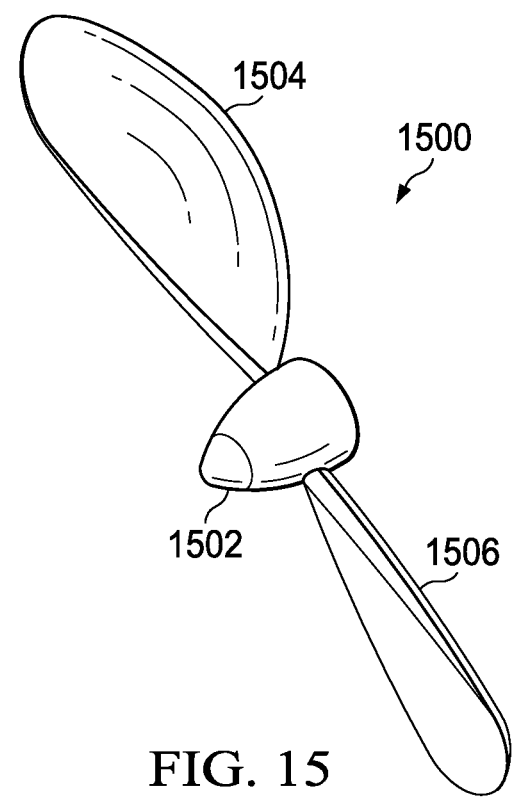
FIG. 15 is an illustration of an inflatable blade that provides an aerodynamic function in the form of differential thrust in accordance with an illustrative embodiment.

With reference to FIG. 15, an illustration of an inflatable blade that provides an aerodynamic function in the form of differential thrust is depicted in accordance with an illustrative embodiment. As used herein, differential thrust may be referred to as a cyclic thrust. As shown, inflatable propeller 1500 is an example of one physical implementation for inflatable propeller 110 shown in block form in FIG. 1.

In this illustrative example, inflatable propeller 1500 is configured to provide differential thrust as an aerodynamic function. Inflatable propeller 1500 includes hub 1502, inflatable blade 1504 and inflatable blade 1506. Differential thrust is provided by the varying the shape of inflatable blade 1504 and inflatable blade 1506 as inflatable blade 1504 and inflatable blade 1506 rotate. Differential thrust, as used herein, refers to varying an amount of thrust generated by the blades as the blades rotate. In other words, the amount of thrust generated may be based on a change in aerodynamic function during a single rotation of a blade. For example, an amount of pitch may be varied as the blade rotates from zero to 360 degrees.

As depicted, inflatable blade 1504 and inflatable blade 1506 are inflated with a fluid to different pressures such that the shapes of the blades are different from each other in this illustrative example. In this particular example, if inflatable blade 1504 and inflatable blade 1506 are inflated to the same pressure, the inflatable blades would have the same shape. Further, other pressures may be used to change the shape of the inflatable blades to other shapes for other functions.

As depicted, inflatable blade 1504 provides a higher level thrust than inflatable blade 1506. In this manner, asymmetric thrust may be generated using inflatable propeller 1500. In this manner, a change in pitch or yaw of the aircraft may be made to change the position of an aircraft using inflatable propeller 1500.

Figure 16:
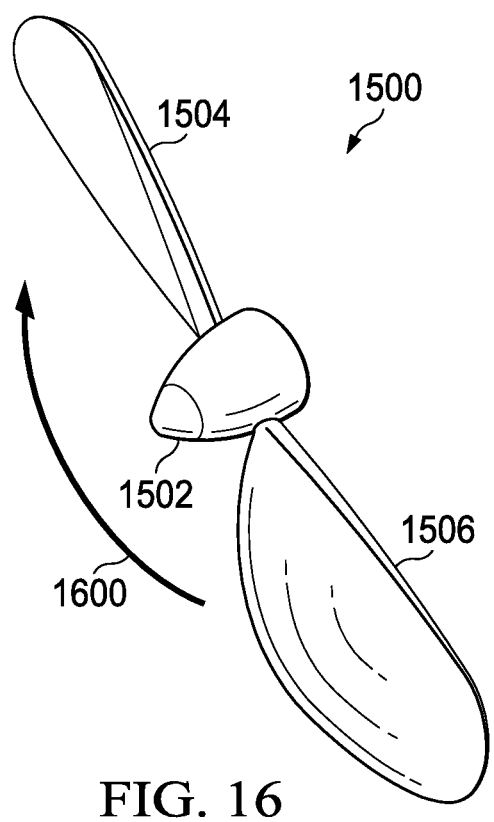
FIG. 16 is another illustration of asymmetric propeller with inflatable blades in accordance with illustrative embodiment.

Turning now to FIG. 16, another illustration of asymmetric propeller with inflatable blades is depicted in accordance with an illustrative embodiment. In this example, the pressure of inflatable blade 1504 and inflatable blade 1506 may change during operation of inflatable propeller 1500.

In this illustrative example, inflatable propeller 1500 has rotated in the direction of arrow 1600. Further, the pressure of inflatable blade 1504 has been reduced and the pressure of inflatable blade 1506 has been increased in pressure. Now, inflatable blade 1506 provides more thrust than inflatable blade 1506. In this manner, thrust may be generated in a particular direction to change the pitch or yaw of the aircraft. This change and other changes may be used to control movement of an aircraft in which the movement may include controlling at least one of the orientation, direction, acceleration, speed, or other movement of the aircraft.

Figure 17:
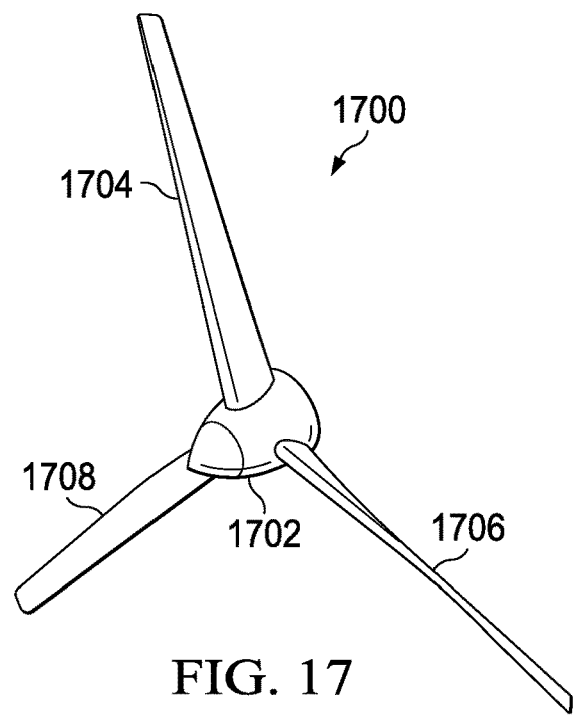
FIG. 17 is an illustration of another inflatable propeller with three inflatable blades in accordance with an illustrative embodiment.

Turning now to FIG. 17, an illustration of another inflatable propeller with three inflatable blades is depicted in accordance with an illustrative embodiment. In this illustrative example, inflatable propeller 1700 is an example of one physical implementation for inflatable propeller 110 shown in block form in FIG. 1.

As depicted, inflatable propeller 1700 has hub 1702, inflatable blade 1704, inflatable blade 1706, and inflatable blade 1708, which are examples of an implementation for a group of inflatable blades 120 shown in block form in FIG. 1. As depicted, inflatable blade 1704, inflatable blade 1706, and inflatable blade 1708 may be implemented to include functions as describe with respect to inflatable blade 200 shown in block form in FIG. 2.

Figure 18:
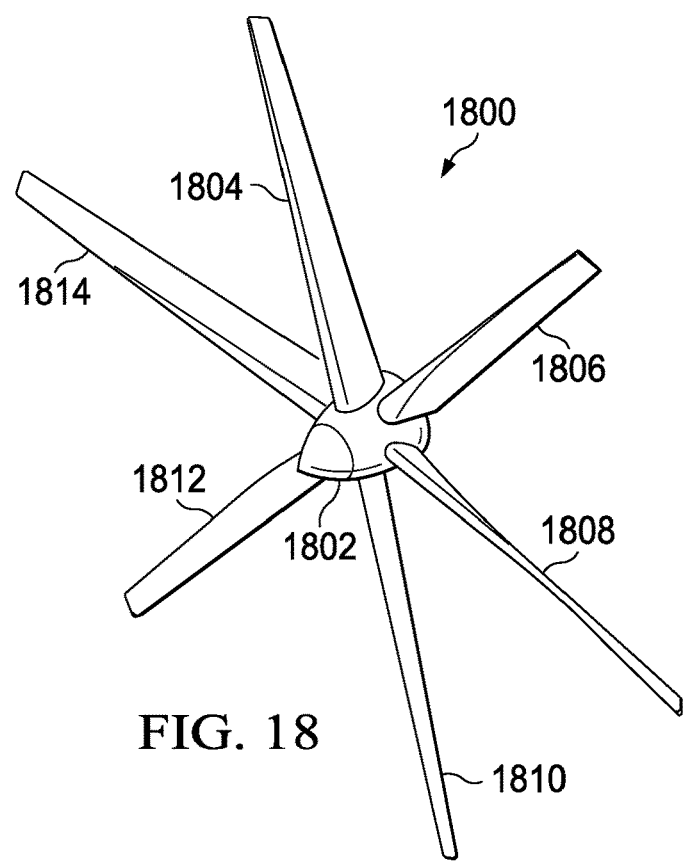
FIG. 18 is an illustration of an inflatable propeller with six inflatable blades in accordance with an illustrative embodiment.

With reference next to FIG. 18, an illustration of an inflatable propeller with six inflatable blades is depicted in accordance with an illustrative embodiment. In this illustrative example, inflatable propeller 1800 is an example of yet another physical implementation for inflatable propeller 110 shown in block form in FIG. 1.

As depicted, inflatable propeller 1800 has hub 1802, inflatable blade 1804, inflatable blade 1806, inflatable blade 1808, inflatable blade 1810, inflatable blade 1812, and inflatable blade 1814. These six inflatable blades are examples of an implementation for the group of inflatable blades 120 shown in block form in FIG. 1. As depicted, inflatable blade 1804, inflatable blade 1806, inflatable blade 1808, inflatable blade 1810, inflatable blade 1812, and inflatable blade 1814 may be implemented to include functions as describe with respect to inflatable blade 200 shown in block form in FIG. 2.

The illustrations of inflatable propeller 400 in FIGS. 4-18 are provided for the purpose of showing different physical implementations for inflatable propeller 110 shown in block form in FIG. 1. These illustrations are not meant to limit the manner in which other illustrative embodiments may be implemented.

For example, inflatable propeller 400 in FIG. 4 is illustrated as having two inflatable blades, inflatable blade 404 and inflatable blade 406. Other inflatable propellers may have other numbers of inflatable blades. For example, another inflatable propeller may have one inflatable blade, four inflatable blades, nine inflatable blades, or some other number of inflatable blades.

As another example, in other illustrative examples, the blades may also change inflation or other characteristics for the blades other than those shown in FIGS. 4-18. For example, other characteristics include at least one of spanwise twist, camber, spanwise curvature, or other suitable characteristics.

Figure 19:
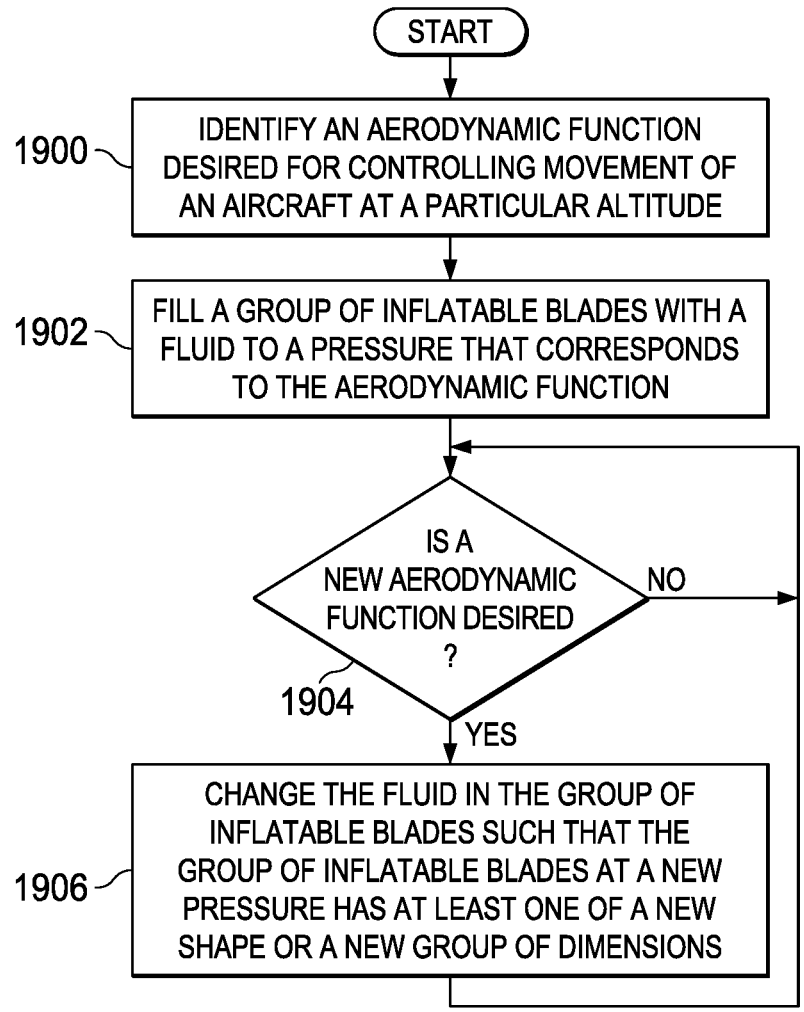
FIG. 19 is an illustration of a flowchart of a process for controlling movement of an aircraft in accordance with an illustrative embodiment.

Turning next to FIG. 19, an illustration of a flowchart of a process for controlling movement of an aircraft is depicted in accordance with an illustrative embodiment. The process illustrated in FIG. 19 may be implemented using aircraft movement control system 102 to control movement 108 of aircraft 106 in FIG. 1.

The process begins by identifying an aerodynamic function desired for controlling movement of an aircraft at a particular altitude (operation 1900). The aerodynamic function identified in operation 1900 is part of a group of aerodynamic functions used to control the movement of the aircraft at a number of different altitudes. The group of aerodynamic functions may include, for example, propulsion, buoyancy, lift, or other types of functions that may be used to control the movement of the aircraft.

The process fills a group of inflatable blades with a fluid to a pressure that corresponds to the aerodynamic function (operation 1902). The fluid in the group of inflatable blades results in a pressure being present in the group of inflatable blades. The group of inflatable blades at the pressure has a shape and a group of dimensions that provide the aerodynamic function.

The process then determines whether a new aerodynamic function is desired (operation 1904). If a new aerodynamic function is desired, the process changes the fluid in the group of inflatable blades such that the group of inflatable blades at a new pressure has at least one of a new shape or a new group of dimensions (operation 1906). The process then returns to operation 1904. The group of inflatable blades with at least one of a new shape or a new group of dimensions provides the new aerodynamic function.

With reference again to operation 1904, if a new aerodynamic function is not desired, the process returns to operation 1904 during operation of the inflatable propeller. In this manner, the inflatable propeller may perform a number of different types of functions to control the movement of the aircraft. These functions may include additional functions in addition to propulsion. The additional functions may include, for example, buoyancy or lift.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed concurrently, or the blocks may sometimes be performed in the reverse order, depending upon the functionality involved. Also, other blocks may be added in addition to the illustrated blocks in a flowchart or block diagram.

Figure 20:
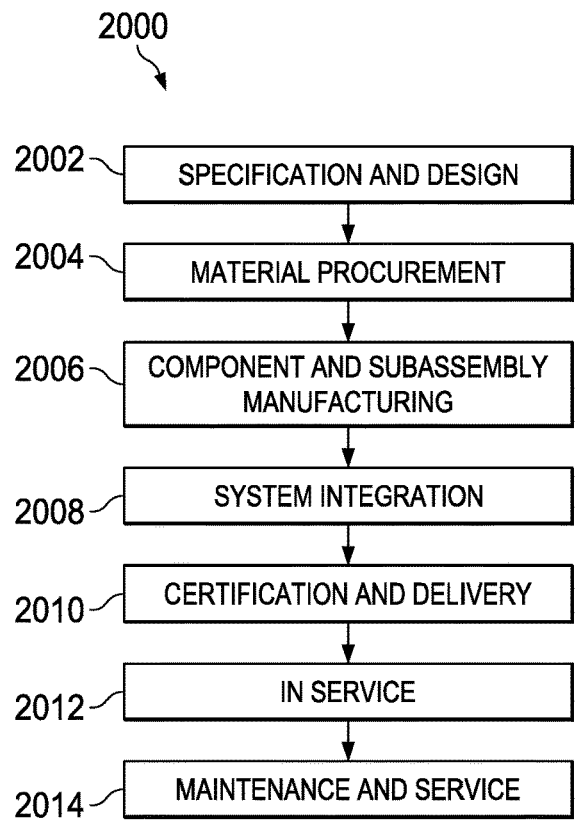
FIG. 20 is an illustration of an aircraft manufacturing and service method in accordance with an illustrative embodiment.
Figure 21:
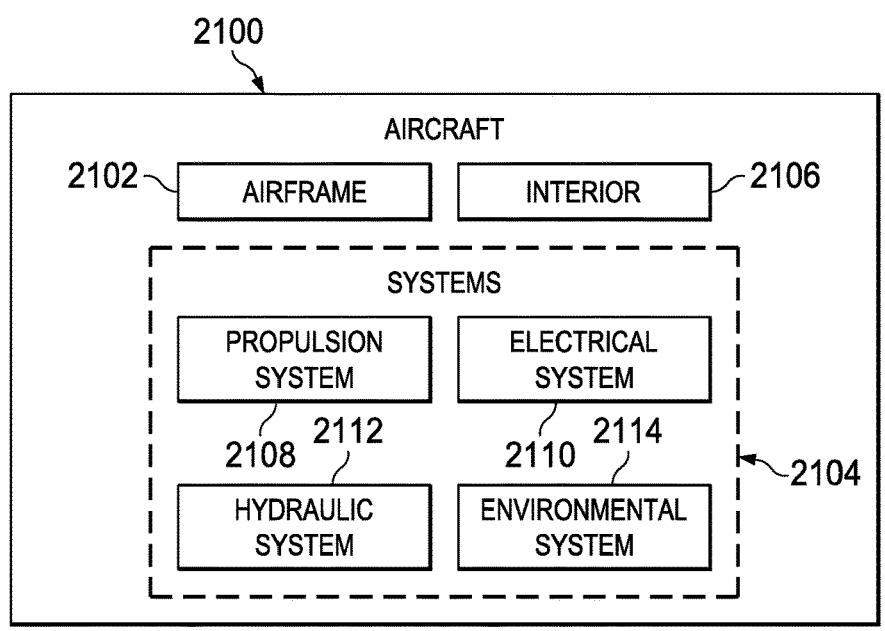
FIG. 21 is an illustration of an aircraft in which an illustrative embodiment may be implemented.

The illustrative embodiments of the present disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 take place. Thereafter, aircraft 2100 may go through certification and delivery 2010 in order to be placed in service 2012. While in service 2012 by a customer, aircraft 2100 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with a plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 for an aircraft movement control system, including an inflatable propeller, may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. For example, the inflatable propeller may be used during in service 2012 to control movement of aircraft 2100.

Thus, the illustrative embodiments provide a method and apparatus for controlling movement of an aircraft. Thus, an aircraft movement control system may provide a method and apparatus that overcome a technical problem with controlling the movement of the aircraft at different altitudes. The use of an inflatable propeller may provide one or more technical solutions to controlling the movement of the aircraft in a manner not available using currently available propellers. For example, a fluid in the inflatable propeller may be controlled to provide desired aerodynamic functions based on the altitudes at which the aircraft operates.

For example, a group of inflatable blades for the inflatable propeller may be configured to have at least one of a different length or different dimensions that provide a desired level of propulsion for certain altitudes. Further, the inflatable propeller in the illustrative examples provides a technical solution in which the movement of the aircraft may be controlled in a number of different ways other than through propulsion. The configuration of the inflatable propeller may also be controlled to provide aerodynamic functions that include at least one of buoyancy or lift in addition to or in place of propulsion for the aircraft, depending on the particular implementation. Currently available propellers do not provide these types of functions.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a hub; and
   a group of inflatable blades in which each inflatable blade of the group of inflatable blades has an end connected to the hub, wherein the group of inflatable blades is configured to have a group of aerodynamic functions that control movement of an aircraft at a number of different altitudes, wherein the group of aerodynamic functions is selected by a group of modes of inflation with a fluid;
   wherein at least one inflatable blade of the group of inflatable blades comprises:

an inflatable outer structure inflatable with the fluid; and fluid bladders within the inflatable outer structure, wherein each fluid bladder of the fluid bladders is directly connected to the end.

2. The apparatus of claim 1 further comprising:
an inflation controller configured to control the fluid in the group of inflatable blades.

3. The apparatus of claim 1, wherein an aerodynamic function from the group of aerodynamic functions that controls the movement is selected from at least one of propulsion, buoyancy, or lift.

4. The apparatus of claim 1, wherein
at least one of the inflatable outer structure or the fluid bladders are selectively inflated to change at least one of a shape or a group of dimensions for the inflatable outer structure.

5. The apparatus of claim 4, wherein the fluid is a first fluid and, wherein the inflatable outer structure is inflated with the first fluid and the fluid bladders are inflated with a second fluid.

6. The apparatus of claim 4, wherein the fluid bladders have a bladder shape selected from at least one of a rod, a sphere, or a disk.

7. The apparatus of claim 1, wherein the hub is a first hub and the group of inflatable blades is a first group of inflatable blades and further comprising:
a second hub; and
a second group of inflatable blades in which each inflatable blade of the second group of inflatable blades has a second end associated with the second hub, wherein the second group of inflatable blades is configured to have the group of aerodynamic functions that controls the movement of the aircraft at the number of different altitudes, wherein the group of aerodynamic functions is selected by the group of modes of inflation with the fluid.

8. The apparatus of claim 1, wherein the fluid is one of helium, hydrogen, neon, ammonia, methane, oxygen, air, or nitrogen.

9. The apparatus of claim 1, wherein the group of inflatable blades is comprised of a material that changes a shape or a group of dimensions of the at least one inflatable blade of the group of inflatable blades based on a pressure of the fluid.

10. The apparatus of claim 9, wherein the material is comprised of at least one of a shape memory material (SMM), a shape memory alloy (SMA), or a shape memory polymer (SMP).

11. The apparatus of claim 1, wherein the aircraft is selected from one of a lighter-than-air aircraft, a heavier-than-air aircraft, high-altitude long endurance (HALE) aircraft, a flying wing, an airship, a zeppelin, or a blimp.

12. An aircraft movement control system comprising:
an inflatable propeller that comprises a hub and a group of inflatable blades in which each inflatable blade of the group of inflatable blades has an end associated with the hub, wherein the group of inflatable blades has a shape and a group of dimensions that provide propulsion with a desired level of performance at a selected altitude;
wherein at least one inflatable blade of the group of inflatable blades comprises:
an inflatable outer structure; and
fluid bladders within the inflatable outer structure, wherein the inflatable outer structure and the fluid bladders are configured to be selectively inflatable with a fluid to change at least one of the shape or the group of dimensions for the group of inflatable blades, wherein each fluid bladder of the fluid bladders is directly connected to the end.

13. The aircraft movement control system of claim 12 further comprising:
an inflation controller configured to control a pressure of the fluid in the group of inflatable blades, wherein a change in the pressure changes the shape and the group of dimensions for the at least one inflatable blade of the group of inflatable blades.

14. The aircraft movement control system of claim 12, wherein the inflatable propeller provides a group of aerodynamic functions that controls movement, and wherein an aerodynamic function from the group of aerodynamic functions is selected from one of buoyancy or lift in addition to the propulsion.

15. The aircraft movement control system of claim 12, wherein the fluid is a first fluid and, wherein the inflatable outer structure is inflated with the first fluid and the fluid bladders are inflated with a second fluid.

16. The aircraft movement control system of claim 12, wherein the fluid bladders have a bladder shape selected from at least one of a rod, a sphere, or a disk.

17. The aircraft movement control system of claim 12, wherein the group of inflatable blades is comprised of a material that changes the shape or the group of dimensions of the group of inflatable blades based on a pressure of the fluid.

18. The aircraft movement control system of claim 17, wherein the fluid is selected from one of helium, hydrogen, neon, ammonia, methane, oxygen, air, or nitrogen.

19. The aircraft movement control system of claim 18, wherein the material is comprised of at least one of a shape memory material (SMM), a shape memory alloy (SMA), or a shape memory polymer (SMP).

20. The aircraft movement control system of claim 12, wherein the aircraft movement control system is configured to control movement of an aircraft and wherein the aircraft is selected from one of a high-altitude long endurance (HALE) aircraft, a lighter-than-air aircraft, a flying wing, an airship, a zeppelin, or a blimp.

21. A method for controlling movement of an aircraft, the method comprising:
identifying an aerodynamic function desired for controlling the movement of the aircraft at a particular altitude, wherein the aerodynamic function identified is part of a group of aerodynamic functions used to control the movement of the aircraft at a number of different altitudes; and
filling a group of inflatable blades with a fluid to a pressure that corresponds to the aerodynamic function, wherein each inflatable blade of the group of inflatable blades has an end connected to a hub and wherein the group of inflatable blades at the pressure has a shape and a group of dimensions that provide the aerodynamic function;
wherein at least one inflatable blade of the group of inflatable blades comprises:
an inflatable outer structure inflatable with the fluid; and
fluid bladders within the inflatable outer structure, wherein each fluid bladder of the fluid bladders is directly connected to the end.

22. The method of claim 21, wherein the aerodynamic function from the group of aerodynamic functions that controls the movement is selected from one of propulsion, buoyancy, or lift.

23. The method of claim 21, wherein the group of inflatable blades is comprised of a material that changes the shape or the group of dimensions of the group of inflatable blades based on the pressure of the fluid.

24. The method of claim 21, wherein
at least one of the inflatable outer structure or the fluid bladders are selectively inflated to change at least one of the shape or the group of dimensions for the inflatable outer structure.

\* \* \* \* \*